United States Patent
Axtell, III et al.

(10) Patent No.: US 12,195,391 B2
(45) Date of Patent: Jan. 14, 2025

(54) COLORED GLASS FRITS AND RELATED METHODS FOR LASER MARKING APPLICATIONS

(71) Applicant: Ferro Corporation, Mayfield Heights, OH (US)

(72) Inventors: Enos A. Axtell, III, Seven Hills, OH (US); Joseph E. Sarver, Washington, PA (US); John J. Maloney, Solon, OH (US); Srinivasan Sridharan, Strongsville, OH (US); George E. Sakoske, Independence, OH (US)

(73) Assignee: Ferro Corporation, Mayfield Heights, OH (US)

( * ) Notice: Subject to any disclaimer, the term of this patent is extended or adjusted under 35 U.S.C. 154(b) by 358 days.

(21) Appl. No.: 17/614,736

(22) PCT Filed: May 22, 2020

(86) PCT No.: PCT/US2020/034220
§ 371 (c)(1),
(2) Date: Nov. 29, 2021

(87) PCT Pub. No.: WO2020/247193
PCT Pub. Date: Dec. 10, 2020

(65) Prior Publication Data
US 2022/0227662 A1    Jul. 21, 2022

Related U.S. Application Data

(60) Provisional application No. 62/857,503, filed on Jun. 5, 2019.

(51) Int. Cl.
| | | |
|---|---|---|
| *C03C 8/06* | (2006.01) | |
| *C03C 3/064* | (2006.01) | |
| *C03C 3/066* | (2006.01) | |
| *C03C 3/091* | (2006.01) | |
| *C03C 3/093* | (2006.01) | |
| *C03C 3/118* | (2006.01) | |
| *C03C 4/00* | (2006.01) | |
| *C03C 8/02* | (2006.01) | |
| *C03C 8/04* | (2006.01) | |

(52) U.S. Cl.
CPC ............. *C03C 8/06* (2013.01); *C03C 3/064* (2013.01); *C03C 3/066* (2013.01); *C03C 3/091* (2013.01); *C03C 3/093* (2013.01); *C03C 3/118* (2013.01); *C03C 4/0071* (2013.01); *C03C 8/02* (2013.01); *C03C 8/04* (2013.01); *C03C 2204/00* (2013.01); *C03C 2205/00* (2013.01)

(58) Field of Classification Search
CPC .. C03C 8/06; C03C 8/02; C03C 3/064; C03C 3/066; C03C 3/091; C03C 3/093; C03C 3/118
See application file for complete search history.

(56) References Cited

U.S. PATENT DOCUMENTS

| | | | |
|---|---|---|---|
| 4,847,218 | A | 7/1989 | Schittenhelm et al. |
| 6,835,680 | B2 | 12/2004 | Taguchi et al. |
| 9,487,435 | B2 | 11/2016 | Sakoske et al. |
| 10,836,673 | B2 | 11/2020 | Kim et al. |
| 2009/0247385 | A1 | 10/2009 | Ide |
| 2014/0026619 | A1 | 1/2014 | Maloney et al. |
| 2016/0052820 | A1 | 2/2016 | Dietz et al. |
| 2016/0199877 | A1 | 7/2016 | Sarver et al. |
| 2022/0234942 | A1* | 7/2022 | Axtell ............... C03C 3/091 |

FOREIGN PATENT DOCUMENTS

| | | |
|---|---|---|
| EP | 1818997 A2 | 8/2007 |
| SU | 1206239 A | 1/1986 |
| SU | 1715731 A1 | 2/1992 |
| WO | 2012/151228 A1 | 11/2012 |
| WO | 2013/126369 A1 | 8/2013 |

OTHER PUBLICATIONS

European Search Report for EP20817683.4 dated Jul. 19, 2023.
International Search Report for PCT/US2020/034220 dated Aug. 20, 2020, 1 page.
International Search Report for PCT/US2020/034228 dated Aug. 20, 2020, 1 page.
International Search Report for PCT/US2020/034164 dated Oct. 1, 2020 1 page.
English Abstract of SU 1206239 A published Jan. 23, 1986, 1 page.
English Abstract of SU 1715731 A1 published Feb. 29, 1992, 1 page.
U.S. Appl. No. 17/614,620, filed Nov. 29, 2021.
U.S. Appl. No. 17/613,545, filed Nov. 23, 2021.

* cited by examiner

*Primary Examiner* — Elizabeth A. Bolden
(74) *Attorney, Agent, or Firm* — Sand, Sebolt & Wernow Co., LPA

(57) ABSTRACT

A marking composition for forming marks or indicia on a substrate is provided for laser marking applications. The composition includes a glass frit, a carrier, and absorber particles. The glass frit includes alkali metal oxides, glass forming oxides, and one or more transition metal oxides. The glass frit is devoid of at least one of bismuth and zinc.

7 Claims, 2 Drawing Sheets

(Left) (Right)

(Left) (Right)

(Left)

(Right)

(Left)

(Right)

COLORED GLASS FRITS AND RELATED METHODS FOR LASER MARKING APPLICATIONS

FIELD

The present subject matter relates to colored glass frits use in laser marking applications and related methods of laser marking using such compositions. The present subject matter also relates to colored glass frits containing transition metals. The present subject matter also relates to articles marked using the noted colored compositions and/or methods.

BACKGROUND

Laser marking is a marking technique that uses lasers and other forms of radiant energy to bond an additive marking substance to a wide range of substrates. Laser marking forms permanent marks on various substrates, including metals, glass, and ceramic parts and is used in many applications, ranging from aerospace to awards and engraving industries. Laser marking differs from more widely known techniques such as laser engraving and laser ablation in that laser marking is an additive process, adding material to the substrate to form the marking instead of removing material as in those techniques.

For metal substrates, parts can be permanently marked with high contrast, high resolution marks for logos, barcoding, and identification and serialization purposes without damage to the substrate. With glass and ceramics, complex surfaces can be decorated or marked and the traditional firing process replaced by a laser and a marking composition with a permanent bond of the composition and surface being formed in seconds.

The marking compositions can includes one or more glass frits, a carrier, and absorber particles. The marking compositions are applied on a substrate, and, for example, radiant energy from a laser source is provided to the selected portion of the marking composition to form marking. During the marking process, laser power level and laser scan speed are typically controlled. Therefore, it would be potentially desirable to have marking compositions that can form high contrast colored marks over extended ranges of combined processing parameters such as laser power level and laser scan speed.

SUMMARY

The difficulties and drawbacks associated with previously known materials and approaches are addressed in the present subject matter as follows. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with one aspect, laser marking composition are provided that produce high contrast colored markings, i.e. marks or indicia. More particularly, in accordance with this aspect, the laser marking composition includes a glass frit. The glass frit comprises; from about 0.1 to about 16 mol % $Li_2O$, from about 0.1 to about 25 mol % $Na_2O+K_2O+Rb_2O+Cs_2O$, from about 0.1 to about 27 mol % transition metal oxides, from about 1 to about 45 mol % $B_2O_3+Al_2O_3$, from about 20 to about 80 mol % $SiO_2+TiO_2$, and from about 0 to about 40 mol % F. The transition metal oxides are one or more selected from the group consisting of $Fe_2O_3$, $MnO_2$, $Cr_2O_3$, and $Co_3O_4$. The laser marking composition is devoid of at least one of Bi and Zn, which results in a reduced manufacturing cost compared with Bi containing marking composition. The laser marking composition further includes a carrier.

In accordance with another aspect, a laser marking composition comprises a glass frit comprising: from about 2 to about 12 mol % $Li_2O$, from about 2 to about 25 mol % $Na_2O+K_2O+Rb_2O+Cs_2O$, from about 2 to about 27 mol % transition metal oxides, from about 5 to about 40 mol % $B_2O_3+Al_2O_3$, from about 25 to about 75 mol % $SiO_2+TiO_2$, and from about 0 to about 25 mol % F. $Li_2O+Na_2O+K_2O+Rb_2O+Cs_2O$ ranges from about 4 to about 24 mol %, and $B_2O_3+TiO_2$ ranges about 6 to about 30 mol %. The glass frit further comprises from about 0.1 to about 20 mol % $Bi_2O_3+ZnO$, and ZnO+transition metal oxides range from about 12 to about 26 mol %. The glass frit includes one or more transition metal oxides selected from $Fe_2O_3$, $MnO_2$, $Cr_2O_3$, and $Co_3O_4$, and is devoid of at least one of Bi and Zn. The laser marking composition provides high contrast colored marks, which are formed over the extended ranges of combined processing parameters of laser power level and laser scan speed. Accordingly, a method of forming marks using the subject laser marking composition provides wide processing window can be achieved for marking process while reducing the manufacturing cost due to limited use of Bi and/or Zn.

In accordance with still another aspect, a laser marking composition comprises a glass frit comprising: from about 4 to about 15 mol % $Li_2O$, from about 6 to about 20 mol % $Na_2O+K_2O+Rb_2O+Cs_2O$, from about 0.1 to about 10 mol % transition metal oxides, from about 3 to about 30 mol % $B_2O_3+Al_2O_3$, from about 30 to about 75 mol % $SiO_2+TiO_2$, and from about 0 to about 25 mol % Fe $Li_2O+Na_2O+K_2O+Rb_2O+Cs_2O$ ranges about from about 13 to about 23 mol %. The glass frit further comprises from about 4 to about 18 mol % $Bi_2O_3+ZnO$. The glass frit includes one or more transition metal oxides selected from $Fe_2O_3$, $MnO_2$, $Cr_2O_3$, and $Co_3O_4$, and is devoid of at least one of Bi and Zn. The laser marking composition provides high contrast colored marks, which are formed over the extended ranges of combined processing parameters such as laser power level and laser scan speed. Accordingly, a method of forming marks using the subject laser marking composition provides wide processing window while reducing the manufacturing cost due to limited use of Bi and/or Zn.

In accordance with still yet another aspect, the present subject matter provides a method of forming the laser marking composition on a substrate. The method includes providing the substrate, and providing the laser marking composition on the substrate. The laser marking composition comprises a glass frit comprising: from about 0.1 to about 16 mol % $Li_2O$, from about 0.1 to about 25 mol % $Na_2O+K_2O+Rb_2O+Cs_2O$, from about 0.1 to about 27 mol % transition metal oxides, from about 1 to about 45 mol % $B_2O_3+Al_2O_3$, from about 20 to about 80 mol % $SiO_2+TiO_2$, and from about 0 to about 40 mol % F. The transition metal oxides are one or more selected from the group consisting of $Fe_2O_3$, $MnO_2$, $Cr_2O_3$, and $Co_3O_4$. The laser marking composition is devoid of at least one of Bi and Zn. The marking composition includes a carrier. The method also includes exposing at least a portion of the composition to laser radiation such that the irradiated portion of the composition absorbs the laser radiation, increases in temperature, chemically bonds with the substrate, and forms a fused mark on the substrate that has a luminance, color, and/or degree of capacity that contrasts from the substrate.

To the accomplishment of the foregoing and related ends, the invention, then, involves the features hereinafter fully described and particularly pointed out in the claims. The following description set forth in detail certain illustrative embodiments of the invention. These embodiments are indicative, however, of but a few of the various ways in which the principles of the invention may be employed. Other objects, advantages and novel features of the invention will become apparent from the following detailed description of the invention.

DETAILED DESCRIPTION OF THE EMBODIMENTS

Figure 1:
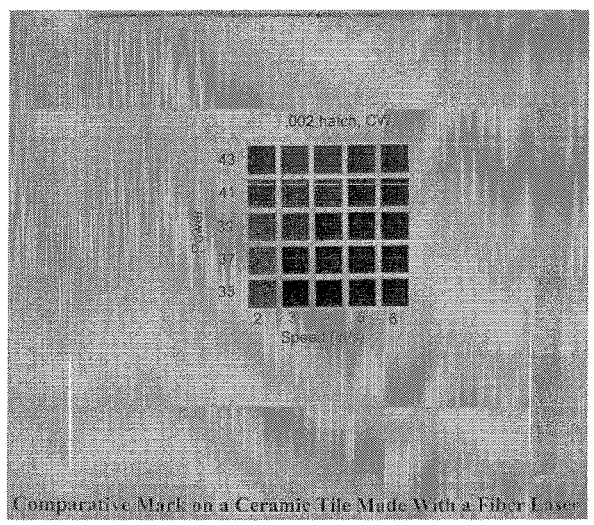
FIG. 1 is an array of laser marks that result from the application of a laser power grid using a fiber laser to ceramic files, each coated with LMC-6013 (left) and Composition 'A' (right) modified version of LMC-6015 according to one embodiment of the present subject matter.
Figure 1:
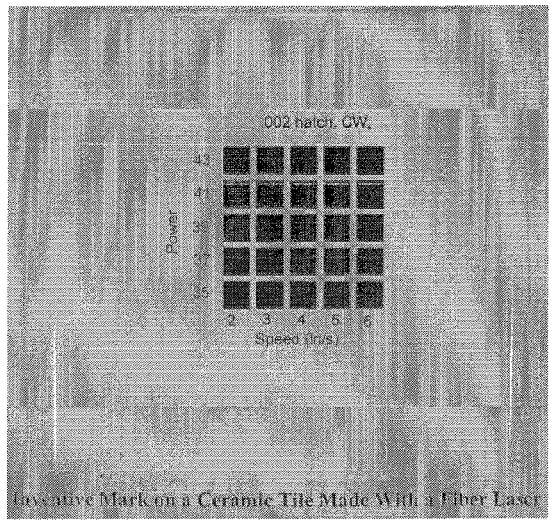

The laser marking compositions according to embodiments of the present subject matter contain a glass frit including a low content of $B_2O_3$ (typically less than 15 wt. %, preferably less than 10 wt. %, or more preferably less than 5 wt. %) or no $Bi_2O_3$, and a low content of ZnO (typically less than 15 wt. %, preferably less than 10 wt. %, or more preferably less than 5 wt. %) or no ZnO. The marking compositions according to embodiments of the present subject matter contain transition metal oxides and produce colored laser marking compositions. In one embodiment, the subject laser marking compositions provide bismuth-free, chemically durable laser marking compositions. In another embodiment, the subject laser marking compositions provide low-bismuth, chemically durable laser marking compositions. By incorporating one or more transition metal oxides in the low-bismuth (or bismuth free) and/or low zinc (or zinc-free) laser marking composition, colored marks with high contrast can be achieved.

The subject compositions are useful in the method of laser marking. The subject laser marking compositions according to one embodiment of the present subject matter are devoid of at least one of bismuth and zinc, which are advantageous over bismuth and/or zinc containing marking compositions in that they are generally more highly colored. The subject laser marking compositions require a limited amount of bismuth and/or zinc, in particular, bismuth, which is known to be costly. Accordingly, reduced manufacturing cost would be achieved. The subject laser marking compositions also include one or more transition metal elements, which in part are responsible for high contrast colored marks after the marking process. The subject laser marking compositions provide a wide processing window such that marks are formed under wide ranges of laser power level and laser scan speed, compared with laser marking compositions with relatively large amounts of bismuth and/or zinc. Therefore, the subject invention provides new and useful laser marking compositions and methods which exhibit various distinct advantages over other marking compositions and methods.

To prepare the laser marking compositions in accordance with one embodiment of the present subject matter, one or more necessary glass frits are ground to a fine powder using conventional techniques including milling. The glass frits are then combined with the other solids components as necessary. The solids are then mixed with the necessary carrier to form the laser marking compositions. The viscosity is adjusted as desired.

These results demonstrate the excellent performance characteristics of the glass frits and marking compositions including the glass frits of the present subject matter for laser marking application.

Marking Compositions

The components of the subject compositions, articles and methods are detailed herein below. Compositional percentages are by weight. Certain embodiments of the invention are envisioned where at least some percentages, temperatures, times, and ranges of other values are preceded by the modifier "about." All compositional percentages for glass frits disclosed herein are molar, and are given for a blend of precursors prior to firing unless described otherwise. For example, glass frit refers to a blend of precursor materials prior to firing, which is mixed with other solid/liquid components to form a marking composition. Compositional percentages for marking materials are given as weight percent (wt. %). Glass components and glass frits are expressed in mol %. Details on each ingredient follow.

The marking compositions can be classified according to the type of substrate to be laser marked. That is, one preferred type of marking composition is a glass marking composition. Another preferred marking composition is a ceramic marking composition. Yet, another preferred composition is a metal marking composition. The marking compositions generally include (i) a glass frit, (ii) a laser absorber comprising one or more populations of particles, and (iii) a carrier (or solvent), which would be described in detail below.

According to the embodiments of the present subject matter, marking composition can be used for glass substrates such as soda-lime glass, borosilicate glasses such as Pyrex, Borofloat 33 and Eagle XG, barium crown glasses, low-iron glasses such as Opti-White, fused silica glasses and the like. According to other embodiments of the present subject matter, marking materials can also be used to mark technical ceramic substrates such as alumina, mullite, zirconia, silica, AZS (alumina-zirconia-silica), porcelain enamels, and commercially available ceramic tiles. The marking materials are also useful for marking natural stone surfaces such as marble, granite, slate, flint and the like. According to other embodiments of the present subject matter, marking compositions are useful more marking metal substrates such as aluminum and its alloys, stainless steel, brass, bronze, pewter, INCONEL, INVAR, tungsten, molybdenum, titanium and their alloys and the like.

The marking composition comprises a carrier (or solvent) from about 30 wt. % to about 70 wt. %, a glass frit from about 20 wt. % to about 65 wt %, a laser absorber particles from about 0 wt. % to about 10 wt. % and a resin binder from about 0 wt % to about 10 wt. %. The glass frit, laser absorber particles, and resin binder disclosed herein are added to a carrier (or solvent) suitable for spraying, screen-printing, pad printing, ink-jet printing, spin coating, digital printing, roll-coating and other application processes known to those skilled in the art. The vehicles useful for the instant invention are described below in more detail.

Glass Frit Components

As used herein, the term "glass frit" means pre-fused glass material which is typically produced by rapid solidification of molten material followed by grinding or milling to the desired powder size. Finely ground glass materials are suitable for marking glass or ceramic substrates.

Combinations of ranges of oxides indicated hereinabove as "typical", "preferred", "more preferred", and "most preferred" in various combinations are available, so long as such combinations of ranges can add up to 100 mol %. For example, a composition for forming marks or indicia on a substrate includes a glass frit. The glass frits includes: from about 0.1 to about 16 mol % of $Li_2O$, from about 0.1 to about 25 mol % of $Na_2O+K_2O+Rb_2O+Cs_2O$, from about 0.1 to about 27 mol % transition metal oxides, from about 1 to about 45 mol % of $B_2O_3+Al_2O_3$, from about 20 to about 80 mol % of $SiO_2+TiO_2$, and from 0 to about 40 mol % of F. The transition metal oxides are one or more selected from the group consisting of $Fe_2O_3$, $MnO_2$, $Cr_2O_3$, and $Co_3O_4$. The glass frit is devoid of at least one of Bi and Zn.

In accordance with the present subject matter, glass frits set forth in Table 1 are used for preparing the marking composition. For example, the glass frits include, $Li_2O$: typically 0.1-16 mol %, preferably 0.1-15 mol %, and more preferably 0.1-12.5 mol %, and most preferably 0.1-10 mol %; $Na_2O+K_2O+Rb_2O+Cs_2O$: typically 0.1-25 mol %, preferably 5-20 mol %, and more preferably 7-18 mol %, and most preferably 8-16 mol %; transition metal oxides: typically 0.1-27 mol %, preferably 0.2-20 mol %, more preferably 0.2-18 mol %, and most preferably 0.5-16 mol %; $B_2O_3+Al_2O_3$: typically 1-45 mol %, preferably 1-45 mol %, more preferably 2-40 mol %, and most preferably 5-35 mol %; $SiO_2+TiO_2$: typically 20-80 mol %, preferably 25-80 mol %, more preferably 29-75 mol %, and most preferably 30-70 mol %; and F: typically 0-40 mol %, preferably 0-40 mol %, more preferably 0-30 mol %, and most preferably 0-25 mol %. The glass frit is devoid of at least one of Bi and Zn. The transition metal oxides are one or more selected from the group consisting of $Fe_2O_3$, $MnO_2$, $Cr_2O_3$, and $Co_3O_4$.

Table 1 below shows glass frits useful in the practice of the subject invention. The glass frits in Table 1 can be used in forming a marking composition useful in laser marking application, which will be described herein. The oxide constituent amounts for an embodiment need not be limited to those in a single column such as typical, preferred, more preferred, and most preferred. Formulation ranges from different columns in Table 1 can be combined so long as the sum of those ranges can add up to 100 mol %. All values are in mol % unless indicated otherwise. The glass frits in Table 1 are devoid of at least one of Bi and Zn. Alternately the glass frits in Table 1 are devoid of Bi and Zn.

TABLE 1

Glass Frit Component Formulation Ranges

| Component | Typical | Preferred | More Preferred | Most Preferred |
|---|---|---|---|---|
| $Li_2O$ | 0.1-16 | 0.1-15 | 0.1-12.5 | 0.1-10 |
| $Na_2O + K_2O + Rb_2O + Cs_2O$ | 0.1-25 | 5-20 | 7-18 | 8-16 |
| Transition metal oxides ($Fe_2O_3$, $MnO_2$, $Cr_2O_3$, $CO_3O_4$) | 0.1-27 | 0.1-20 | 0.2-18 | 0.5-16 |
| $B_2O_3 + Al_2O_3$ | 1-45 | 1-45 | 2-40 | 5-35 |
| $SiO_2 + TiO_2$ | 20-80 | 25-80 | 29-75 | 30-70 |
| F | 0-40 | 0-40 | 0-30 | 0-25 |

In another embodiment, the glass frits include, from about 2 to about 12 mol % $Li_2O$, from about 2 to about 25 mol % $Na_2O+K_2O+Rb_2O+Cs_2O$, from about 2 to about 27 mol % of one or more transition metal oxides selected from the group consisting of $Fe_2O_3$, $MnO_2$, $Cr_2O_3$, and $Co_3O_4$, from about 5 to about 40 mol % $B_2O_3+Al_2O_3$, and from about 25 to about 75 mol % $SiO_2+TiO_2$, from about 0 to about 40 mol % F, wherein $Li_2O+Na_2O+K_2O+Rb_2O+Cs_2O$ ranges from about 4 to about 24 mol %, and $B_2O_3+TiO_2$ ranges from about 6 to about 30 mol %. The glass frit further comprises from about 0.1 to about 20 mol % $Bi_2O_3+ZnO$. ZnO+transition metal oxides ranges from about 12 to about 26 mol %. The glass frit is devoid of at least one of Bi and Zn.

In yet another embodiment, the glass frit includes, from about 4 to about 10 mol % $Li_2O$, from about 3 to about 16 mol % $Na_2O+K_2O+Rb_2O+Cs_2O$, from about 9 to about 25 mol % of one or more transition metal oxides selected from the group consisting of $Fe_2O_3$, $MnO_2$, $Cr_2O_3$, and $Co_3O_4$, from about 10 to about 30 mol % $B_2O_3+Al_2O_3$, and from about 40 to about 56 mol % $SiO_2+TiO_2$, from about 0 to about 25 mol % F, wherein $Li_2O+Na_2O+K_2O+Rb_2O+Cs_2O$ ranges from about 8 to about 20 mol %, and $B_2O_3+TiO_2$ ranges from about 10 to about 30 mol %. The glass frit further comprises from about 0.1 to about 20 mol % $Bi_2O_3+ZnO$. ZnO+transition metal oxides ranges from about 12 to about 26 mol %. The glass frit is devoid of at least one of Bi and Zn.

In still yet another embodiment, the glass frit includes, from about 5 to about 8 mol % $Li_2O$, from about 6 to about 12 mol % $Na_2O+K_2O+Rb_2O+Cs_2O$, from about 11 to about 20 mol % of one or more transition metal oxides selected from the group consisting of $Fe_2O_3$, $MnO_2$, $Cr_2O_3$, and $Co_3O_4$, from about 17 to about 24 mol % $B_2O_3+Al_2O_3$, and from about 46 to about 58 mol % $SiO_2+TiO_2$, from about 0 to about 40 mol % F, wherein $Li_2O+Na_2O+K_2O+Rb_2O+Cs_2O$ ranges from about 12 to about 18 mol %, and $B_2O_3+TiO_2$ ranges from about 18 to about 30 mol %. The glass frit further comprises from about 0.1 to about 20 mol % $Bi_2O_3+ZnO$. ZnO+transition metal oxides ranges from about 12 to about 26 mol %. The glass frit is devoid of at least one of Bi and Zn.

In yet another embodiment, the glass frit includes, from about 6 to about 9 mol % $Li_2O$, from about 8 to about 13 mol % $Na_2O+K_2O+Rb_2O+Cs_2O$, from about 20 to about 26 mol % of one or more transition metal oxides selected from the group consisting of $Fe_2O_3$, $MnO_2$, $Cr_2O_3$, and $Co_3O_4$, from about 10 to about 17 mol % $B_2O_3+Al_2O_3$, and from about 44 to about 50 mol % $SiO_2+TiO_2$, from about 0 to about 25 mol % F, wherein $Li_2O+Na_2O+K_2O+Rb_2O+Cs_2O$ ranges from about 15 to about 20 mol %, and $B_2O_3+TiO_2$ ranges from about 12 to about 17 mol %. The glass frit further comprises from about 0.1 to about 10 mol % $Bi_2O_3+ZnO$.

ZnO+transition metal oxides ranges from about 12 to about 26 mol %. The glass frit is devoid of at least one of Bi and Zn.

In still yet another embodiment, the glass frit includes, from about 8 to about 12 mol % $Li_2O$, from about 5 to about 12 mol % $Na_2O+K_2O+Rb_2O+Cs_2O$, from about 2 to about 8 mol % of one or more transition metal oxides selected from the group consisting of $Fe_2O_3$, $MnO_2$, $Cr_2O_3$, and $Co_3O_4$, from about 5 to about 11 mol % $B_2O_3+Al_2O_3$, and from about 55 to about 62 mol % $SiO_2+TiO_2$, from about 0 to about 25 mol % F, wherein $Li_2O+Na_2O+K_2O+Rb_2O+Cs_2O$ ranges from about 15 to about 20 mol %, and $B_2O_3+TiO_2$ ranges from about 8 to about 14 mol %. The glass frit further comprises from about 9 to about 18 mol % $Bi_2O_3+ZnO$. ZnO+transition metal oxides ranges from about 12 to about 26 mol %. The glass frit is devoid of at least one of Bi and Zn.

In another embodiment, the glass frit includes, from about 8 to about 12 mol % $Li_2O$, from about 5 to about 10 mol % $Na_2O+K_2O+Rb_2O+Cs_2O$, from about 4 to about 8 mol % of one or more transition metal oxides selected from the group consisting of $Fe_2O_3$, $MnO_2$, $Cr_2O_3$, and $Co_3O_4$, from about 5 to about 10 mol % $B_2O_3+Al_2O_3$, and from about 55 to about 62 mol % $SiO_2+TiO_2$, from about 0 to about 25 mol % F, wherein $Li_2O+Na_2O+K_2O+Rb_2O+Cs_2O$ ranges from about 15 to about 20 mol %, and $B_2O_3+TiO_2$ ranges from about 8 to about 14 mol %. The glass frit further comprises about 11 to about 16 mol % $Bi_2O_3+ZnO$. ZnO+transition metal oxides ranges from about 12 to about 26 mol %. The glass frit is devoid of at least one of Bi and Zn.

In yet another embodiment, the glass frit includes, from about 4 to about 15 mol % $Li_2O$, from about 6 to about 20 mol % $Na_2O+K_2O+Rb_2O+Cs_2O$, from about 0.1 to about 10 mol % of one or more transition metal oxides selected from the group consisting of $Fe_2O_3$, $MnO_2$, $Cr_2O_3$, and $Co_3O_4$, from about 3 to about 30 mol % $B_2O_3+Al_2O_3$, and from about 30 to about 75 mol % $SiO_2+TiO_2$, from about 0 to about 25 mol % F, wherein $Li_2O+Na_2O+K_2O+Rb_2O+Cs_2O$ ranges from about 13 to about 23 mol %. The glass frit further comprises about 4 to about 18 mol % $Bi_2O_3+ZnO$. The glass frit is devoid of at least one of Bi and Zn.

In still yet another embodiment, the glass frit includes, from about 6 to about 12 mol % $Li_2O$, from about 7 to about 13 mol % $Na_2O+K_2O+Rb_2O+Cs_2O$, from about 0.1 to about 4 mol % of one or more transition metal oxides selected from the group consisting of $Fe_2O_3$, $MnO_2$, $Cr_2O_3$, and $Co_3O_4$, from about 8 to about 20 mol % $B_2O_3+Al_2O_3$, and from about 50 to about 64 mol % $SiO_2+TiO_2$, from about 0 to about 25 mol % F, wherein $B_2O_3+TiO_2$ ranges from about 11 to about 22 mol %. The glass frit further comprises from about 4 to about 15 mol % $Bi_2O_3+ZnO$. The glass frit is devoid of at least one of Bi and Zn.

In yet another embodiment, the glass frit includes, from about 6 to about 12 mol % $Li_2O$, from about 7 to about 13 mol % $Na_2O+K_2O+Rb_2O+Cs_2O$, from about 0.1 to about 4 mol % of one or more transition metal oxides selected from the group consisting of $Fe_2O_3$, $MnO_2$, $Cr_2O_3$, and $Co_3O_4$, from about 8 to about 20 mol % $B_2O_3+Al_2O_3$, and from about 50 to about 64 mol % $SiO_2+TiO_2$, from about 0 to about 25 mol % F, wherein $B_2O_3+TiO_2$ ranges from about 12 to about 19 mol %. The glass frit further comprises from about 5 to about 12 mol % $Bi_2O_3+ZnO$. The glass frit is devoid of at least one of Bi and Zn.

In still yet another embodiment, the glass frit includes, from about 5 to about 11 mol % $Li_2O$, from about 6 to about 12 mol % $Na_2O+K_2O+Rb_2O+Cs_2O$, from about 0.1 to about 4 mol % of one or more transition metal oxides selected from the group consisting of $Fe_2O_3$, $MnO_2$, $Cr_2O_3$, and $Co_3O_4$, from about 7 to about 19 mol % $B_2O_3+Al_2O_3$, and from about 52 to about 65 mol % $SiO_2+TiO_2$, from about 0 to about 25 mol % F, wherein $B_2O_3+TiO_2$ ranges from about 13 to about 22 mol %. The glass frit further comprises from about 7 to about 17 mol % $Bi_2O_3+ZnO$. The glass frit is devoid of at least one of Bi and Zn.

In yet another embodiment, the glass frit includes, from about 5 to about 11 mol % $Li_2O$, from about 6 to about 12 mol % $Na_2O+K_2O+Rb_2O+Cs_2O$, from about 0.1 to about 4 mol % of one or more transition metal oxides selected from the group consisting of $Fe_2O_3$, $MnO_2$, $Cr_2O_3$, and $Co_3O_4$, from about 7 to about 19 mol % $B_2O_3+Al_2O_3$, and from about 52 to about 65 mol % $SiO_2+TiO_2$, from about 0 to about 25 mol % F, wherein $B_2O_3+TiO_2$ ranges from about 14 to about 19 mol %. The glass frit further comprises from about 8 to about 16 mol % $Bi_2O_3+ZnO$. The glass frit is devoid of at least one of Bi and Zn.

Table 2 below shows other embodiments of glass frit compositions useful in the practice of the subject matter. The glass frits in Table 2 can be used in forming a marking composition useful in laser marking application, and are devoid of at least one of Bi and Zn. All values in Table 2 are in mol % unless indicated otherwise. The glass frits in Table 2 refer to a blend of precursor materials prior to firing, which is mixed with other solid/liquid components to form a marking composition. While most of precursor materials in Table 2 are in the form of oxides, the precursor materials can be metal salts.

TABLE 2

| Glass Frit Component Formulation Ranges | | | | | | | |
| --- | --- | --- | --- | --- | --- | --- | --- |
| Component | EX. 1 | EX. 2 | EX. 3 | EX. 4 | EX. 5 | EX. 6 | EX. 7 |
| $Li_2O$ | 4-13.5 | 4-13 | 6-13 | 6-12 | 8.3-12 | 5-10 | 6-10 |
| $Na_2O$ | 4-13 | 5-13 | 6-12 | 7-12 | 6-9 | 6-11 | 6.5-11.5 |
| $K_2O + Rb_2O + Cs_2O$ | 0-12 | 0-12 | 0-9 | 0-9 | 0-7 | 0-10 | 0-7.5 |
| $SiO_2$ | 35-60 | 35-60 | 35-55 | 41-53 | 44-55 | 47-60 | 49-58 |
| Transition Metal Oxides | 0.1-27 | 0.1-26 | 2-24.5 | 11-24.5 | 2-7 | 0.1-9 | 0.1-4 |
| $B_2O_3$ | 1-27 | 1-25 | 3-25 | 9-23 | 3-10 | 5-17 | 8-15 |
| $Al_2O_3$ | 0.1-12 | 0.1-12 | 0.1-8 | 0.1-5 | 0.1-5 | 0.1-5 | 0.1-3.5 |
| $TiO_2$ | 0.1-11 | 0.1-11 | 0.1-8 | 0.1-5 | 2-7.5 | 0.1-7 | 1-6 |
| F | 0-40 | 0-35 | 0-30 | 0-30 | 0-30 | 0-35 | 0-30 | from the group consisting of $Fe_2O_3$, $MnO_2$, $Cr_2O_3$, and $Co_3O_4$, from about 8 to about 20 mol % $B_2O_3+Al_2O_3$, and from about 50 to about 64 mol % $SiO_2+TiO_2$, from about 0 to about 25 mol % F, wherein $B_2O_3+TiO_2$ ranges from about 11 to about 22 mol %. The glass frit further comprises from According to other embodiments, a glass frit includes a blend of precursor materials, prior to firing, useful in preparing for a composition for forming marks or indicia on a substrate. In one embodiment, a glass frit includes: from about 4 to about 13.5 mol % $Li_2O$, from about 4 to about 13 mol % $Na_2O$, from about 0 to about 12 mol % $K_2O+Rb_2O+$ $Cs_2O$, from about 35 to about 60 mol % $SiO_2$, from about 0.1 to about 27 mol % transition metal oxides, from about 1 to about 27 mol % $B_2O_3$, from about 0.1 to about 12 mol % $Al_2O_3$, from about 0 to about 15 mol % $Bi_2O_3$, from about 0 to about 16 mol % ZnO, from about 0.1 to about 11 mol % $TiO_2$, and from about 0 to about 40 mol % F. The transition metal oxides are one or more selected from the group consisting of $Fe_2O_3$, $MnO_2$, $Cr_2O_3$, and $Co_3O_4$.

In another embodiment, a glass frit includes: from about 4 to about 13 mol % $Li_2O$, from about 5 to about 13 mol % $Na_2O$, from about 0 to about 12 mol % $K_2O+Rb_2O+Cs_2O$, from about 35 to about 60 mol % $SiO_2$, from about 0.1 to about 26 mol % transition metal oxides, from about 1 to about 25 mol % $B_2O_3$, from about 0.1 to about 12 mol % $Al_2O_3$, from about 0 to about 7 mol % $Bi_2O_3$, from about 0 to about 16 mol % ZnO, from about 0.1 to about 11 mol % $TiO_2$, and from about 0 to about 35 mol % F. The transition metal oxides are one or more selected from the group consisting of $Fe_2O_3$, $MnO_2$, $Cr_2O_3$, and $Co_3O_4$.

In yet another embodiment, a glass frit includes: from about 6 to about 13 mol % $Li_2O$, from about 6 to about 12 mol % $Na_2O$, from about 0 to about 9 mol % $K_2O+Rb_2O+Cs_2O$, from about 35 to about 55 mol % $SiO_2$, from about 2 to about 24.5 mol % transition metal oxides, from about 3 to about 25 mol % $B_2O_3$, from about 0.1 to about 8 mol % $Al_2O_3$, from about 0 to about 6 mol % $Bi_2O_3$, from about 0 to about 15 mol % ZnO, from about 0.1 to about 8 mol % $TiO_2$, and from about 0 to about 30 mol % F. The transition metal oxides are one or more selected from the group consisting of $Fe_2O_3$, $MnO_2$, $Cr_2O_3$, and $Co_3O_4$.

In still yet another embodiment, a glass frit includes: from about 6 to about 12 mol % $Li_2O$, from about 7 to about 12 mol % $Na_2O$, from about 0 to about 9 mol % $K_2O+Rb_2O+Cs_2O$, from about 41 to about 53 mol % $SiO_2$, from about 11 to about 24.5 mol % transition metal oxides, from about 9 to about 23 mol % $B_2O_3$, from about 0.1 to about 5 mol % $Al_2O_3$, from about 0 to about 6 mol % $Bi_2O_3$, from about 0 to about 4 mol % ZnO, from about 0.1 to about 5 mol % $TiO_2$, and from about 0 to about 30 mol % F. The transition metal oxides are one or more selected from the group consisting of $Fe_2O_3$, $MnO_2$, $Cr_2O_3$, and $Co_3O_4$.

In another embodiment, a glass frit includes: from about 8.3 to about 12 mol % $Li_2O$, from about 6 to about 9 mol % $Na_2O$, from about 0 to about 7 mol % $K_2O+Rb_2O+Cs_2O$, from about 44 to about 55 mol % $SiO_2$, from about 2 to about 7 mol % transition metal oxides, from about 3 to about 10 mol % $B_2O_3$, from about 0.1 to about 5 mol % $Al_2O_3$, from about 0 to about 5 mol % $Bi_2O_3$, from about 10 to about 15 mol % ZnO, from about 2 to about 7.5 mol % $TiO_2$, and from about 0 to about 30 mol % F. The transition metal oxides are one or more selected from the group consisting of $Fe_2O_3$, $MnO_2$, $Cr_2O_3$, and $Co_3O_4$.

In yet another embodiment, a glass frit includes: from about 5 to about 10 mol % $Li_2O$, from about 6 to about 11 mol % $Na_2O$, from about 0 to about 10 mol % $K_2O+Rb_2O+Cs_2O$, from about 47 to about 60 mol % $SiO_2$, from about 0.1 to about 9 mol % transition metal oxides, from about 5 to about 17 mol % $B_2O_3$, from about 0.1 to about 5 mol % $Al_2O_3$, from about 0.1 to about 15 mol % $Bi_2O_3$, from about 0 to about 6 mol % ZnO, from about 0.1 to about 7 mol % $TiO_2$, and rom about 0 to about 35 mol % F. The transition metal oxides are one or more selected from the group consisting of $Fe_2O_3$, $MnO_2$, $Cr_2O_3$, and $Co_3O_4$.

In still yet another embodiment, a glass frit includes: from about 6 to about 10 mol % $Li_2O$, from about 6.5 to about 11.5 mol % $Na_2O$, from about 0 to about 7.5 mol % $K_2O+Rb_2O+Cs_2O$, from about 49 to about 58 mol % $SiO_2$, from about 0.1 to about 4 mol % transition metal oxides, from about 8 to about 15 mol % $B_2O_3$, from about 0.1 to about 3.5 mol % $Al_2O_3$, from about 4 to about 15 mol % $Bi_2O_3$, from about 0 to about 6 mol % ZnO, from about 1 to about 6 mol % $TiO_2$, and from about 0 to about 30 mol % F. The transition metal oxides are one or more selected from the group consisting of $Fe_2O_3$, $MnO_2$, $Cr_2O_3$, and $Co_3O_4$.

The present subject matter also includes the additions of anions (preferentially F, S and Se) to oxygen sites in the glass frits to flux the dissolution of precursors into the glass, modify the coefficient of thermal expansion or work as aide to fusion during laser marking.

The glass frits can be formed by any suitable techniques. In one embodiment, the glass frits are formed by blending the starting materials (e.g., aforementioned oxides) and melting together at a temperature of from about 982° C. (1800° F.) to about 1500° C. (2730° F.) for about 45-90 minutes to form a molten glass having the desired composition. The molten glass formed can then be suddenly cooled by any suitable technique, including water quenching or roll quenching, to form a frit. The frit can then be ground using, for example, milling techniques to a fine particle size from about 1 to about 8 microns, preferably 2 to about 6 microns, and more preferably from about 3 to about 5 microns.

Throughout the specification and claims, in all cases, for all tables and for all embodiments, when a range is indicated as being bounded by zero on the lower end, or a component is indicated as being included "up to" or "5." a specified mole %, these provides support for the same range bounded by 0.01 or 0.1 at the lower end, or a component being included from 0.01 or 0.1 mole % up to the specified upper limit for mole %. In a recitation of a group of ingredients, such as "up to 25 mole % $Na_2O+K_2O+Rb_2O+Cs_2O$," the recitation also provides support for 0.01-25 mol % or 0.1-25 mol % of the recited group of ingredients as well as such ranges of each individual ingredient in the group (e.g., 0.01-25 mol % $Na_2O$ or 0.1-25 mol % $K_2O$) and any combination thereof. Further, 0-40 mol % F also supports 0.01-40 mol % F or 0.1-40 mol % F.

According to present subject matter, the glass frit is lead free and cadmium free. Additionally, the glass frit can be further substantially devoid of at least one of bismuth, and zinc. For example, the glass frit can be substantially devoid of lead, cadmium, bismuth, and zinc. In another embodiment, the glass frit can be substantially devoid of lead and bismuth, but include zinc. In yet another embodiment, the glass frit is substantially devoid of lead and zinc, but include bismuth. As used herein, "substantially devoid of an element" means that the glass frits do not include the element in any form, or the element or any compounds that contain the element are not intentionally added to the frit portions. In one example, the impurity levels is 100 ppm or less. For example, in some embodiments, all the materials used in forming the frit portions are substantially devoid of at least one of the elements selected from lead, bismuth, and zinc. In another embodiment, a method of making the frit portions does not involve combining at least one of the elements selected from lead, bismuth, and zinc with the frit portions and/or precursor materials of the frit portions.

Resin Binder

The marking compositions of the present subject matter comprise an amount of binder materials to improve rheological properties, green strength, or package stability for the compositions. Binders include epoxies, polyesters, acrylics, methacrylics, cellulosics, vinyls, natural proteins, styrenes, polyalkyls, carbonates, rosins, rosin esters, alkyls, drying oils, and polysaccharides such as starches, guar, dextrins and alginates, and the like.

Laser Absorber

Laser Absorber (laser absorber particles), as used herein, refers to a composition that absorbs radiant energy and bonds with the substrate to form a mark having a luminance, color value, or degrees of opacity that provide visual contrast with the substrate. In one embodiment, the laser absorber is in particulate form and is combined with the other components to form the marking compounds.

The compositions of absorber particles comprise but are not limited to complex inorganic pigments, zirconium compounds, silicon compounds, calcium compounds, molybdenum compounds, vanadium compounds, bismuth containing oxide compounds, tungsten compounds, and combinations thereof.

Carrier (or Solvent)

In accordance with the present subject matter one or more solvents or carriers are incorporated for transferring the absorber particles. The solvents or carriers comprise water or other aqueous-based liquids, or one or more organic solvents. If water is selected as the carrier, the water can be purified water. Examples of purified water include but are not limited to distilled water and de-ionized (DI) water.

Non-limiting examples of other solvents or carriers include alcohols such as ethanol. Non-limiting examples of organic solvents include ketones, alkanes such as butane (such as if in liquid form as a result of pressurization such as may be used for spray applications), and aromatic organic solvents such as xylenes.

Additional Components

The marking compositions may optionally include additives generally known in the art to improve dispersability, wetting, flow and rheology, and to relieve surface defects.

Method of Forming Laser Marking on Substrate

Regardless of the type of composition or ultimate use intended for the composition, the compositions can be prepared by conventional blending and mixing techniques. The absorber particles can be subjected to one or more size reduction operations to obtain a desired average particle size or range of average particle sizes.

Generally, marking quality depends on a variety of factors, including the substrate used, marking speed, laser spot size, beam overlap, materials thickness, and laser parameters. The marking compositions are applied to the substrate by various methods including a brush on techniques, masking, dosing, deposition, dispensing, coating, metering, painting, spraying, pad printing, screen printing, roll coating, curtain coating, spin coating, digital printing, tape, and others.

The marking processes generally comprise three operations. One operation involves application of the marking composition to a substrate. Another operation involves bonding of the marking composition to the substrate with a laser. The final operation involves removing the excess marking material from the substrate.

In accordance with the present subject matter, a selected portion of the marking material is permanently adhered to the substrate upon irradiation. As used herein, the term "adhere" is used to designate any permanent means of attachment of the irradiated marking material to the substrate. For example, the irradiated marking material is adhered to the surface of the substrate by sintering the marking material to the substrate, fusing the marking material to the surface of the substrate, diffusing at least a portion of the marking material into the substrate, reacting the marking material with the substrate, and the like.

Application

In a particular aspect, the present subject matter provides transfer marking media for use in the laser marking process. These media include a carrier to which is applied, or into which is incorporated, the necessary marking composition.

The thickness of the resulting coating can be adjusted and/or controlled by the use of viscosity agents in the composition, by the control of temperature, and by using optional treatments or pre-coatings on the surface to be marked. Depending upon the concentration of the coloring agent(s) in the composition and other factors, adjusting the coating thickness can be used to at least partially control contrast or darkness of the markings. Typically, thickness of the coating will vary depending upon coating chemistry and heat stability.

Depending upon the type of application technique, the components of the marking compositions will vary. Below in Table 3 are illustrative compositions of the range of components employed for a marking composition according to one embodiment of the present subject matter.

TABLE 3

Range of Components and Typical Weight Percentages

| Component | Weight Percent (wt. %) |
| --- | --- |
| Carrier | 30-70 |
| Glass Frit | 20-65 |
| Resin Binder | 0-10 |
| Absorber Particles | 0-10 |

Marking compositions are typically applied to the substrate with a thickness of at least about 0.1 micron, alternatively from about 1 to about 300 microns, or from about 5 to about 200 microns, or from about 10 to about 100 microns.

While the marking compositions are in solid form, a marking composition can be in the form of a liquid. Water based media are used because of their minimal environmental impact, but solvent based media can also be used to control drying rate, dispersion or moisture sensitivity of certain marking materials. Where dispersions are used, the deposited layer can be dried prior to the irradiation step. The marking material in liquid form can be applied onto the substrate surface by various methods such as screen printing, painting, flood coating, brushing, spraying, roll coating, dipping, flow coating, electrostatic application, spin coating, digital printing, and doctor blading.

Bonding

After the marking material is applied to the surface of the substrate, a selected portion of the marking material is irradiated with a beam to adhere the irradiated marking material to the substrate and to form a permanent marking thereon. Irradiation can be achieved by moving a laser beam over a stationary substrate using conventional beam steering methods, by moving the substrate in relation to the laser beam and/or by masking the substrate. Laser irradiation is typically achieved by directing the beam directly against the layer of marking material, but can also be achieved by directing the beam through a sufficiently transparent substrate.

A wide array of lasers can be used for the present subject matter. Lasers useful in the present methods are those known as $CO_2$ lasers and fiber lasers. A $CO_2$ laser produces a beam of infrared light with the principal wavelength bands centering around 9.4 and 10.6 micrometers. For example, a suitable $CO_2$ laser can be a 35-40 watt $CO_2$ laser with about 10 micron wavelength.

A fiber laser is a laser in which the active gain medium is an optical fiber doped with rare-earth elements such as erbium, ytterbium, neodymium, dysprosium, praseodymium, and thulium. For example, a suitable fiber laser can be a 10 watt non-pulsed fiber laser with from about 904 nm to about 1065 nm wavelength.

Once the marking composition is disposed on a portion of the substrate, the beam emanating from the radiant energy source impinges upon the marking material, which absorbs the radiant energy and increases to the required temperature. In absorbing the radiant energy, at least a portion of the marking material is excited, i.e. has its atoms or molecules raised to an excited state. Typically, a temperature of from about 93° C. (200° F.) to about 815° C. (1500° F.) is reached in approximately one to two microseconds. Once the required temperature is achieved, the marking material and substrate will permanently bond together to form a new marking layer atop the substrate.

Upon irradiation, many different types of permanent marking compositions may be achieved in accordance with the present subject matter. Examples of permanent marking compositions include colored or colorless sintered glass frit, inorganic chromophores fused into the surface of the glass, ceramic or metal substrate, a combination of the two, and metal oxide fused into the glass, ceramic or metal surface or reacted with the substrate material. Because of the interaction with the marking material, the composition of the marking may depend on the composition of the substrate.

Evaluations

A series of investigations was conducted in which the contrast of marks formed using a laser marking method was measured as particle size in the marking compositions was varied. The glass frits disclosed herein according to the embodiments of the present subject matter in the laser marking compositions are responsible for the improved contrast of marks.

Example 1

In a first investigation, LMC-6013, a laser marking material commercially available from Ferro Corporation in Washington, PA, was selected as a comparative marking composition. LMC-6013 includes a carrier, a glass frit, a resin binder, and absorber particles, as described in Table 3. LMC-6013 can optionally include dispersant/surfactant, and silicate minerals. LMC-6013 was uniformly coated on the substrates and dried. Specifically, LMC-6013 was uniformly sprayed on ceramic tiles and glass slides and the treated objects were dried with a hot air gun. After drying, the radiant energy was applied to the marking compositions. In-house designed power grids are used in forming laser markings for each laser. Each power grid is an array of squares (8×4, or 5×5), where each square is marked with a differing set of laser parameters. Subsequently, the excess marking material was washed off from the surfaces.

A 10-watt fiber laser and a 40-watt $CO_2$ laser were used as the source of the radiant energy, respectively. For fiber laser, the power levels used were about 5.6, 5.92, 6.24, 6.56, and 6.88 watts (marked as '35', '37', '39', '41' and '43', respectively to the left side of the array shown in FIGS. 1-2), and the laser scan speed varied between 2 inch/second to 6 inch/second. For $CO_2$ laser, laser power levels varied between about 2, 4, 6, and 8 watts (marked as '5P' and '20P' respectively to the left side of the array shown in FIGS. 3-4), and the laser scan speed varied between 5 inch/second to 40 inch/second. Images for the arrays of laser marks prepared from LMC-6013 are shown in FIGS. 1-4 together with Composition 'A', which will be described below.

Example 2

In another investigation, an inventive marking composition, Composition 'A', was prepared according to the present subject matter. Composition 'A' includes a carrier, a glass frit, a resin binder, absorber particles as described in Table 3. Composition 'A' can optionally include dispersant/surfactant, and silicate minerals. The glass frit used in Composition 'A' is described in Table 4 below. It is noted that the glass frit in Composition 'A' is devoid of at least one of Bi and Zn. The glass frit also includes one or more transition metal oxides selected from $Fe_2O_3$, $MnO_2$, $Cr_2O_3$, and $Co_3O_4$.

The processing window for Composition 'A', and the above-indicated comparative composition, LMC-6013, were compared to each other in forming the marks on the substrates using the $CO_2$ laser and the fiber laser. The processing window was evaluated based on the visual quality of each of the marks from LMC-6013 and Composition 'A', formed at different combination of laser power level and laser scan speed.

TABLE 4

Components of Glass Frit in Composition 'A'.

| Components | mol % |
|---|---|
| $Li_2O$ | 8-12 |
| $Na_2O + K_2O + Rb_2O + Cs_2O$ | 5-12 |
| Transition metal oxides ($Fe_2O_3$, $MnO_2$, $Cr_2O_3$, $CO_3O_4$) | 2-8 |
| $B_2O_3 + Al_2O_3$ | 5-11 |
| $SiO_2 + TiO_2$ | 55-62 |
| F | 0-25 |
| $Li_2O + Na_2O + K_2O + Rb_2O + Cs_2O$ | 15-20 |
| $B_2O_3 + TiO_2$ | 8-14 |
| $Bi_2O_3 + ZnO$ | 9-18 |

It is noted that the chemical compositions for Composition 'A' and LMC-6013 are substantially very similar to each other but for the glass frit used in each marking composition. Composition 'A' in Example 2 exhibits high contrast colored marks after being irradiated. It is noted that marking compositions including the glass frits disclosed herein in accordance with embodiments of the present subject matter provide marks with different colors including, but not limited to black, blue, green, or combinations thereof after marking is formed on the substrate, depending on the compositions of glass frits, concentration of marking composition, number of applications of marking compositions, chemical composition of the substrate or the like. Composition 'A' and other marking compositions disclosed herein share similar visual quality regardless of the color after the marks are formed. For example, the color of Composition 'A' after the marking process is blue, while Composition 'A' exhibits darker colored mark (FIG. 1) when the concentration of the marking composition is increased.

Composition 'A' was uniformly sprayed on the glass and ceramic tiles in a similar way to the comparative marking composition, LMC-6013. After Composition 'A' was sprayed on the glass and ceramic tiles, the glass and the ceramic tiles with Composition 'A' formed thereon were dried using a hot-air gun. Subsequently, the radiant energy from the 40-watt $CO_2$ laser and the 10-watt fiber laser was applied to the marking compositions through the same power grids used for LMC-6013 to produce the desired marks on the substrates and to make a direct comparison between marks from Composition 'A' and LMC-6013. The excess marking material was washed off from the surfaces. The power level and the laser scan speed for the $CO_2$ laser and the fiber laser were set to be identical to the marking processing for LMC-6013. The images for the array of laser marks prepared from Composition 'A' are shown together with laser marks from LMC-6013 in FIGS. 1-4 below.

FIG. 1 shows the array of laser marks after a fiber laser is applied to the comparative marking composition, LMC-6013 (left), and an inventive marking composition, Composition 'A' (right), on ceramic tiles. According to FIGS. 1-2, each row of marks is formed by varying the laser scan speed between 2 inch per second and 6 inch per second while applying a fixed level of laser power. Each column of marks is formed by varying the laser power level between about 5.6 watts to about 6.88 watts while keeping the laser scan speed constant.

It is clearly seem from FIG. 1 that Composition 'A' (right) exhibits greater number of high contrast marks (or darker mark) than LMC-6013 (left) on ceramic tiles. Here, high-contrast marks or dark marks, for the purposes of this disclosure, mean marks that are visible to the human eye, and/or machine readable. For example, a high-contrast or dark mark may appear on a transparent substrate to be a black, brown, purple, blue, green or other high-contrast, dark or colored mark.

Composition 'A' provides uniform dark marks across the entire array of marks formed, and does not exhibit any substantial variation of darkness between neighboring marks. On the other hand, LMC-6013 (left) provides reduced contrast (less dark mark) formed on the left and left-upper portion of the array, including marks formed at scan speed of 2 inch/second with laser power level of about 5.6-6.24 watts (marked as "35', '37', and '39'), and ones formed at scan speed of 3 inch/second with laser power level of about 6.56, and 6.88 watts (marked as '41' and '43'), where they show less dark images than surrounding marks. Accordingly, a skilled person in the art would understand that the processing window of Composition 'A' is wider than LMC-6013.

Figure 2:
FIG. 2 is an array of laser marks that result from the application of a laser power grid using a fiber laser to soda-lime glass, each coated with LMC-6013 (left) and Composition 'A' (right) according to another embodiment of the present subject matter.
Figure 2:
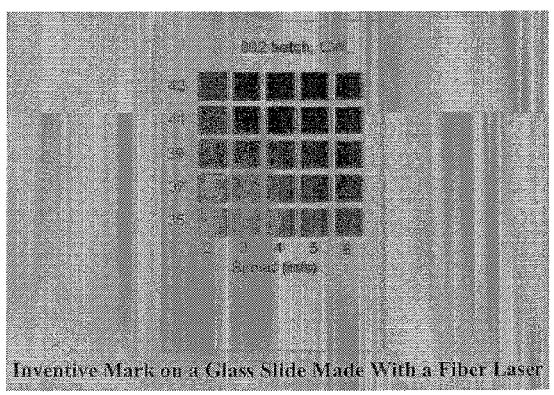

FIG. 2 shows the array of laser marks after a fiber laser is applied to the comparative marking composition, LMC-6013 (left), and an inventive marking composition, Composition 'A' (right) on soda-line glass. While marks are formed at all of the combined processing conditions, FIG. 2 shows that both LMC-6013 and Composition 'A' do not form high contrast colored marks across the entire processing conditions combined with no darkness variation. However, Composition 'A' (right) provides far greater number of high contrast marks (darker marks) compared to LMC-6013. For example, LMC-6013 provides high contrast marks only on a portion of the far right column and/or a portion of the uppermost row of the array, which requires the processing conditions of either high scan speed or high laser power level. On the other hand, Composition 'A' provides low contrast marks only at lower left portion of the entire array, and again, Composition 'A' provides marks with wider processing window than LMC-6013 on the soda-lime glass substrates.

Figure 3:
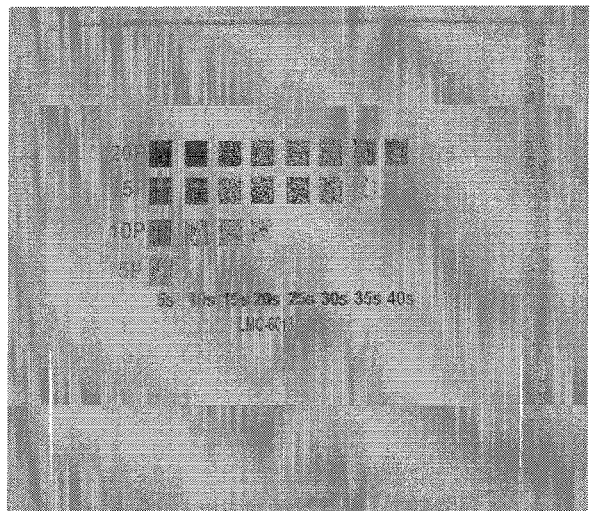
FIG. 3 is an array of laser marks that result from the application of a laser power grid using a $CO_2$ laser to ceramic tiles, each coated with LMC-6013 (left) and Composition 'A' (right) according to still another embodiment of the present subject matter.
Figure 3:
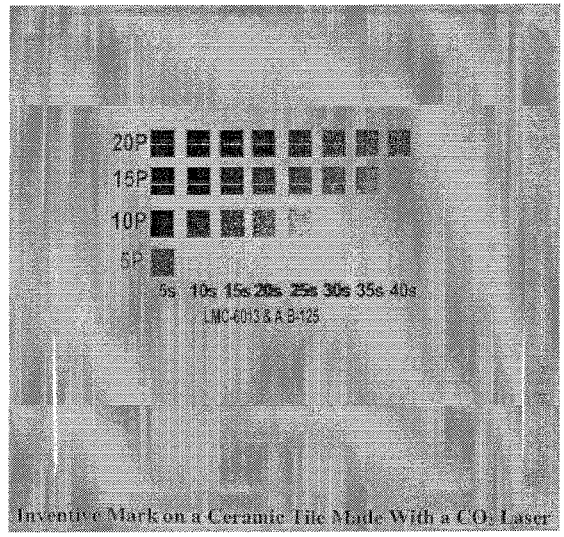

FIG. 3 shows the array of marks formed by a $CO_2$ laser for LMC-6013 (left) and Composition 'A' (right) applied on the ceramic tiles. According to FIGS. 3-4, each row of marks is formed by varying the laser scan speed between 5 inch/second and 40 inch/second while applying a fixed level of laser power. Alternately, each column of marks is formed by varying the laser power level between 2 watts and 8 watts while keeping the laser scan speed constant.

For FIG. 3, similar to FIGS. 1 and 2, Composition 'A' (right) provides greater number of high contrast marks than LMC-6013 (left). For example, LMC-6013 merely exhibits gray colored (or low contrast) marks formed at all the processing conditions combined except for the one at left top corner of the array. On the other hand, Composition 'A' provides suitable dark colored marks at least on the far left column and most of uppermost column of the array. Therefore, it is clear that wider processing window can be achieved for Composition 'A', when compared to LMC-6013.

Figure 4:
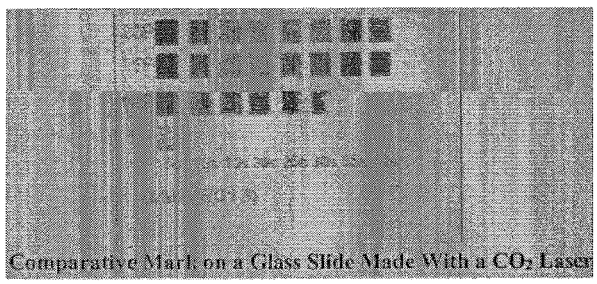
FIG. 4 is an array of laser marks that result from the application of a laser power grid using a $CO_2$ laser to soda-lime glass, each coated with LMC-6013 (left) and Composition 'A' (right).
Figure 4:
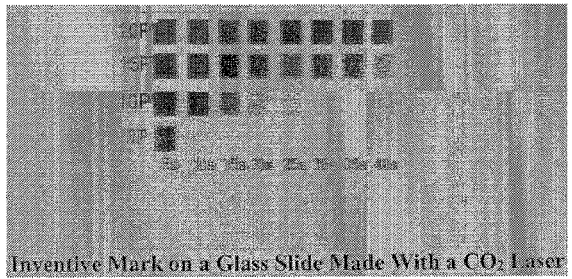

FIG. 4 below shows the array of marks formed by a $CO_2$ laser for LMC-6013 (left) and Composition 'A' (right) applied on the soda-lime glass. Similar to FIG. 3, Composition 'A' (right) provides greater number of high contrast marks than LMC-6013 (left). For example, LMC-6013 merely exhibits relatively dark colored marks only at a portion of the far left column of the array, while Composition 'A' provides high contrast marks on the most of far left column and uppermost row of the array, Where the high contrast marks from Composition 'A' clearly outnumbers high colored marks formed from LMC-6013 (left). As described above, blue color of LMC-6013 in FIG. 4 after marking process, is due to slightly decreased concentration of marking composition. Regardless, wider processing window is secured for obtaining marks with high contrast by using Composition 'A', compared to LMC-6013, which is favorable in the laser marking process.

While only Composition 'A' is compared with the comparative composition LMC-6013, it is noted that other inventive compositions with glass frits disclosed herein also provide broad processing window similar to Composition 'A', when compared with marking compositions including Bi and/or Zn and devoid of any transition metal oxides.

It will be understood that any one or more compositions of one embodiment described herein can be combined with one or more other compositions of another embodiment. Thus, the present subject matter includes any and all combinations of compositions of the embodiments described herein.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims.

The invention is further defined by the following items.

Item 1. A composition for forming marks or indicia on a substrate, the composition comprising:
 a glass frit comprising:
  from about 0.1 to about 16 mol % $Li_2O$,
  from about 0.1 to about 25 mol % $Na_2O+K_2O+Rb_2O+Cs_2O$,
  from about 0.1 to about 27 mol % of one or more transition metal oxides selected from the group consisting of $Fe_2O_3$, $MnO_2$, $Cr_2O_3$, and $Co_3O_4$,
  from about 1 to about 45 mol % $B_2O_3+Al_2O_3$, from about 20 to about 80 mol % $SiO_2+TiO_2$, and
from about 0 to about 40 mol % F,
a carrier, and
absorber particles.

Item 2. The composition of item 1, wherein the glass frit comprises:
from about 0.1 to about 15 mol % $Li_2O$,
from about 5 to about 20 mol % $Na_2O+K_2O+Rb_2O+Cs_2O$,
from about 0.1 to about 20 mol % of one or more transition metal oxides selected
from the group consisting of $Fe_2O_3$, $MnO_2$, $Cr_2O_3$, and $Co_3O_4$, from about 1 to about 45 mol % $B_2O_3+Al_2O_3$,
from about 25 to about 80 mol % $SiO_2+TiO_2$, and
from about 0 to about 40 mol % F.

Item 3. The composition of item 2, wherein the glass frit comprises:
from about 0.1 to about 12.5 mol % $Li_2O$,
from about 7 to about 18 mol % $Na_2O+K_2O+Rb_2O+Cs_2O$,
from about 0.2 to about 18 mol % of one or more transition metal oxides selected from the group consisting of $Fe_2O_3$, $MnO_2$, $Cr_2O_3$, and $Co_3O_4$,
from about 2 to about 40 mol % $B_2O_3+Al_2O_3$,
from about 29 to about 75 mol % $SiO_2+TiO_2$, and
from about 0 to about 30 mol % F.

Item 4. The composition of item 3, wherein the glass frit comprises:
from about 0.1 to about 10 mol % $Li_2O$,
from about 8 to about 16 mol % $Na_2O+K_2O+Rb_2O+Cs_2O$,
from about 0.5 to about 16 mol % of one or more transition metal oxides selected from the group consisting of $Fe_2O_3$, $MnO_2$, $Cr_2O_3$, and $Co_3O_4$,
from about 5 to about 35 mol % $B_2O_3+Al_2O_3$,
from about 30 to about 70 mol % $SiO_2+TiO_2$, and
from about 0 to about 25 mol % F.

Item 5. The composition of item 1, wherein the glass frit comprises:
from about 2 to about 12 mol % $Li_2O$,
from about 2 to about 25 mol % $Na_2O+K_2O+Rb_2O+Cs_2O$,
from about 2 to about 27 mol % of one or more transition metal oxides selected from the group consisting of $Fe_2O_3$, $MnO_2$, $Cr_2O_3$, and $Co_3O_4$,
from about 5 to about 40 mol % $B_2O_3+Al_2O_3$,
from about 25 to about 75 mol % $SiO_2+TiO_2$, and
from about 0 to about 25 mol % F,
wherein $Li_2O+Na_2O+K_2O+Rb_2O+Cs_2O$ ranges from about 4 to about 37 mol %, and $B_2O_3+TiO_2$ ranges about 6 to about 30 mol %, and
further comprising:
from about 0.1 to about 20 mol % $Bi_2O_3+ZnO$,
wherein ZnO+transition metal oxides range from about 12 to about 26 mol %.

Item 6. The composition of item 5, wherein the glass frit comprises:
from about 4 to about 10 mol % $Li_2O$,
from about 3 to about 16 mol % $Na_2O+K_2O+Rb_2O+Cs_2O$,
from about 9 to about 25 mol % of one or more transition metal oxides selected from the group consisting of $Fe_2O_3$, $MnO_2$, $Cr_2O_3$, and $Co_3O_4$,
from about 10 to about 30 mol % $B_2O_3+Al_2O_3$,
from about 40 to about 56 mol % $SiO_2+TiO_2$, and
from about 0 to about 25 mol % F,
wherein $Li_2O+Na_2O+K_2O+Rb_2O+Cs_2O$ ranges from about 8 to about 20 mol %, and $B_2O_3+TiO_2$ ranges about 10 to about 30 mol %, and
further comprising:
from about 0.1 to about 20 mol % $Bi_2O_3+ZnO$.

Item 7. The composition of item 5, wherein the glass frit comprises:
from about 5 to about 8 mol % $Li_2O$,
from about 6 to about 11 mol % $Na_2O+K_2O+Rb_2O+Cs_2O$,
from about 11 to about 17 mol % of one or more transition metal oxides selected from the group consisting of $Fe_2O_3$, $MnO_2$, $Cr_2O_3$, and $Co_3O_4$,
from about 19 to about 24 mol % $B_2O_3+Al_2O_3$,
from about 46 to about 53 mol % $SiO_2+TiO_2$, and
from about 0 to about 25 mol % F,
wherein $Li_2O+Na_2O+K_2O+Rb_2O+Cs_2O$ ranges from about 12 to about 18 mol %, and $B_2O_3+TiO_2$ ranges from about 19 to about 28 mol %, and
further comprising:
from about 0.1 to about 10 mol % $Bi_2O_3+ZnO$.

Item 8. The composition of item 5, wherein the glass frit comprises:
from about 6 to about 9 mol % $Li_2O$,
from about 8 to about 13 mol % $Na_2O+K_2O+Rb_2O+Cs_2O$,
from about 20 to about 26 mol % of one or more transition metal oxides selected from the group consisting of $Fe_2O_3$, $MnO_2$, $Cr_2O_3$, and $Co_3O_4$,
from about 10 to about 17 mol % $B_2O_3+Al_2O_3$,
from about 44 to about 50 mol % $SiO_2+TiO_2$, and
from about 0 to about 25 mol % F,
wherein $Li_2O+Na_2O+K_2O+Rb_2O+Cs_2O$ ranges from about 15 to about 20 mol %, and $B_2O_3+TiO_2$ ranges from about 12 to about 17 mol %, and
further comprising:
from about 0.1 to about 10 mol % $Bi_2O_3+ZnO$.

Item 9. The composition of item 5, wherein the glass frit comprises:
from about 8 to about 12 mol % $Li_2O$,
from about 5 to about 12 mol % $Na_2O+K_2O+Rb_2O+Cs_2O$,
from about 2 to about 8 mol % of one or more transition metal oxides selected from the group consisting of $Fe_2O_3$, $MnO_2$, $Cr_2O_3$, and $Co_3O_4$,
from about 5 to about 11 mol % $B_2O_3+Al_2O_3$,
from about 55 to about 62 mol % $SiO_2+TiO_2$, and
from about 0 to about 25 mol % F,
wherein $Li_2O+Na_2O+K_2O+Rb_2O+Cs_2O$ ranges from about 15 to about 20 mol %, and $B_2O_3+TiO_2$ ranges from about 8 to about 14 mol %, and
further comprising:
from about 9 to about 18 mol % $Bi_2O_3+ZnO$.

Item 10. The composition of item 5, wherein the glass frit comprises:
from about 8 to about 12 mol % $Li_2O$,
from about 5 to about 10 mol % $Na_2O+K_2O+Rb_2O+Cs_2O$,
from about 4 to about 8 mol % of one or more transition metal oxides selected from the group consisting of $Fe_2O_3$, $MnO_2$, $Cr_2O_3$, and $Co_3O_4$,
from about 5 to about 10 mol % $B_2O_3+Al_2O_3$,
from about 55 to about 62 mol % $SiO_2+TiO_2$, and
from about 0 to about 25 mol % F,
wherein $Li_2O+Na_2O+K_2O+Rb_2O+Cs_2O$ ranges from about 15 to about 20 mol %, and $B_2O_3+TiO_2$ ranges from about 8 to about 14 mol %, and further comprising:
from about 11 to about 16 mol % $Bi_2O_3$+ZnO.

Item 11. The composition of item 1, wherein the glass frit comprises:
from about 4 to about 15 mol % $Li_2O$,
from about 6 to about 20 mol % $Na_2O$+$K_2O$+$Rb_2O$+$Cs_2O$,
from about 0.1 to about 10 mol % of one or more transition metal oxides selected from the group consisting of $Fe_2O_3$, $MnO_2$, $Cr_2O_3$, and $Co_3O_4$,
from about 3 to about 30 mol % $B_2O_3$+$Al_2O_3$,
from about 30 to about 75 mol % $SiO_2$+$TiO_2$, and
from about 0 to about 25 mol % F,
wherein $Li_2O$+$Na_2O$+$K_2O$+$Rb_2O$+$Cs_2O$ ranges from about 13 to about 23 mol %, and
further comprising:
from about 4 to about 18 mol % $Bi_2O_3$+ZnO.

Item 12. The composition of item 11, wherein the glass frit comprises:
from about 6 to about 12 mol % $Li_2O$,
from about 7 to about 13 mol % $Na_2O$+$K_2O$+$Rb_2O$+$Cs_2O$,
from about 0.1 to about 4 mol % of one or more transition metal oxides selected from the group consisting of $Fe_2O_3$, $MnO_2$, $Cr_2O_3$, and $Co_3O_4$,
from about 8 to about 20 mol % $B_2O_3$+$Al_2O_3$,
from about 50 to about 64 mol % $SiO_2$+$TiO_2$, and
from about 0 to about 25 mol % F,
wherein $B_2O_3$+$TiO_2$ ranges from about 11 to about 22 mol %, and
further comprising:
from about 4 to about 15 mol % $Bi_2O_3$+ZnO.

Item 13. The composition of item 12, wherein the glass frit comprises:
from about 12 to about 19 mol % $B_2O_3$+$TiO_2$, and
from about 5 to about 12 mol % $Bi_2O_3$+ZnO.

Item 14. The composition of item 11, wherein the glass frit comprises:
from about 5 to about 11 mol % $Li_2O$,
from about 6 to about 12 mol % $Na_2O$+$K_2O$+$Rb_2O$+$Cs_2O$,
from about 0.1 to about 4 mol % of one or more transition metal oxides selected from the group consisting of $Fe_2O_3$, $MnO_2$, $Cr_2O_3$, and $Co_3O_4$,
from about 7 to about 19 mol % $B_2O_3$+$Al_2O_3$,
from about 52 to about 65 mol % $SiO_2$+$TiO_2$, and
from about 0 to about 25 mol % F,
wherein $B_2O_3$+$TiO_2$ ranges from about 13 to about 22 mol %, and
further comprising:
from about 7 to about 17 mol % $Bi_2O_3$+ZnO.

Item 15. The composition of item 14, wherein the glass frit comprises:
from about 14 to about 19 mol % $B_2O_3$+$TiO_2$, and
from about 8 to about 16 mol % $Bi_2O_3$+ZnO.

Item 16. A glass frit for a composition for forming marks or indicia on a substrate, the glass comprising:
from about 4 to about 13.5 mol % $Li_2O$,
from about 4 to about 13 mol % $Na_2O$,
from about 0 to about 12 mol % $K_2O$+$Rb_2O$+$Cs_2O$,
from about 35 to about 60 mol % $SiO_2$,
from about 0.1 to about 27 mol % of one or more transition metal oxides selected from the group consisting of $Fe_2O_3$, $MnO_2$, $Cr_2O_3$, and $Co_3O_4$,
from about 1 to about 27 mol % $B_2O_3$,
from about 0.1 to about 12 mol % $Al_2O_3$,
from about 0 to about 15 mol % $B_2O_3$,
from about 0 to about 16 mol % ZnO,
from about 0.1 to about 11 mol % $TiO_2$, and
from about 0 to about 40 mol % F,
wherein the transition metal oxides are one or more selected from the group consisting of $Fe_2O_3$, $MnO_2$, $Cr_2O_3$, and $Co_3O_4$.

Item 17. The glass frit of item 16 comprising:
from about 4 to about 13 mol % $Li_2O$,
from about 5 to about 13 mol % $Na_2O$,
from about 0 to about 12 mol % $K_2O$+$Rb_2O$+$Cs_2O$,
from about 35 to about 60 mol % $SiO_2$,
from about 0.1 to about 26 mol % of one or more transition metal oxides selected from the group consisting of $Fe_2O_3$, $MnO_2$, $Cr_2O_3$, and $Co_3O_4$,
from about 1 to about 25 mol % $B_2O_3$,
from about 0.1 to about 12 mol % $Al_2O_3$,
from about 0 to about 7 mol % $Bi_2O_3$,
from about 0 to about 16 mol % ZnO,
from about 0.1 to about 11 mol % $TiO_2$, and
from about 0 to about 35 mol % F.

Item 18. The glass frit of item 16 comprising:
from about 6 to about 13 mol % $Li_2O$,
from about 6 to about 12 mol % $Na_2O$,
from about 0 to about 9 mol % $K_2O$+$Rb_2O$+$Cs_2O$,
from about 35 to about 55 mol % $SiO_2$,
from about 2 to about 24.5 mol % of one or more transition metal oxides selected from the group consisting of $Fe_2O_3$, $MnO_2$, $Cr_2O_3$, and $Co_3O_4$,
from about 3 to about 25 mol % $B_2O_3$,
from about 0.1 to about 8 mol % $Al_2O_3$,
from about 0 to about 6 mol % $Bi_2O_3$,
from about 0 to about 15 mol % ZnO,
from about 0.1 to about 8 mol % $TiO_2$, and
from about 0 to about 30 mol % F.

Item 19. The glass frit of item 16 comprising:
from about 6 to about 12 mol % $Li_2O$,
from about 7 to about 12 mol % $Na_2O$,
from about 0 to about 9 mol % $K_2O$+$Rb_2O$+$Cs_2O$,
from about 41 to about 53 mol % $SiO_2$,
from about 11 to about 24.5 mol % of one or more transition metal oxides selected from the group consisting of $Fe_2O_3$, $MnO_2$, $Cr_2O_3$, and $Co_3O_4$,
from about 9 to about 23 mol % $B_2O_3$,
from about 0.1 to about 5 mol % $Al_2O_3$,
from about 0 to about 6 mol % $Bi_2O_3$,
from about 0 to about 4 mol % ZnO,
from about 0.1 to about 5 mol % $TiO_2$, and
from about 0 to about 30 mol % F.

Item 20. The glass frit of item 16 comprising:
from about 8.3 to about 12 mol % $Li_2O$,
from about 6 to about 9 mol % $Na_2O$,
from about 0 to about 7 mol % $K_2O$+$Rb_2O$+$Cs_2O$,
from about 44 to about 55 mol % $SiO_2$,
from about 2 to about 7 mol % of one or more transition metal oxides selected from the group consisting of $Fe_2O_3$, $MnO_2$, $Cr_2O_3$, and $Co_3O_4$,
from about 3 to about 10 mol % $B_2O_3$,
from about 0.1 to about 5 mol % $Al_2O_3$,
from about 0 to about 5 mol % $Bi_2O_3$,
from about 10 to about 15 mol % ZnO,
from about 2 to about 7.5 mol % $TiO_2$, and
from about 0 to about 30 mol % F.

Item 21. The glass frit of item 16 comprising:
from about 5 to about 10 mol % $Li_2O$,
from about 6 to about 11 mol % $Na_2O$,
from about 0 to about 10 mol % $K_2O$+$Rb_2O$+$Cs_2O$,
from about 47 to about 60 mol % $SiO_2$, from about 0.1 to about 9 mol % of one or more transition metal oxides selected from the group consisting of $Fe_2O_3$, $MnO_2$, $Cr_2O_3$, and $Co_3O_4$,
from about 5 to about 17 mol % $B_2O_3$,
from about 0.1 to about 5 mol % $Al_2O_3$,
from about 0.1 to about 15 mol % $Bi_2O_3$,
from about 0 to about 6 mol % ZnO,
from about 0.1 to about 7 mol % $TiO_2$, and
from about 0 to about 35 mol % F.

Item 22. The glass frit of item 16 comprising:
from about 6 to about 10 mol % $Li_2O$,
from about 6.5 to about 11.5 mol % $Na_2O$,
from about 0 to about 7.5 mol % $K_2O+Rb_2O+Cs_2O$,
from about 49 to about 58 mol % $SiO_2$,
from about 0.1 to about 4 mol % of one or more transition metal oxides selected from the group consisting of $Fe_2O_3$, $MnO_2$, $Cr_2O_3$, and $Co_3O_4$,
from about 8 to about 15 mol % $B_2O_3$,
from about 0.1 to about 3.5 mol % $Al_2O_3$,
from about 4 to about 15 mol % $Bi_2O_3$,
from about 0 to about 6 mol % ZnO,
from about 1 to about 6 mol % $TiO_2$, and
from about 0 to about 30 mol % F.

Item 23. A method of forming marks or indicia on a substrate, comprising:
providing a substrate;
providing a composition on the substrate, the composition comprising the glass frit of any of items 1-22; and
exposing at least a portion of the composition to laser radiation such that the irradiated portion of the composition absorbs the laser radiation, increases in temperature, chemically bonds with the substrate, and forms a fused mark on the substrate that has a luminance, color, and/or degree of capacity that contrasts from the substrate.

Item 24. The method of item 23, wherein the glass frit is devoid of at least one of bismuth and zinc.

Item 25. The method of item 24, wherein the glass frit is devoid of bismuth and zinc.

Item 26. The method of item 23, wherein the substrate is selected from one of glass, ceramic and metal.

Item 27. The method of item 23, wherein the laser radiation is selected from a $CO_2$ laser or fiber laser.

What is claimed is:

1. A glass frit for a composition for forming marks or indicia on a substrate, the glass comprising:
from 4 to 13.5 mol % $Li_2O$,
from 4 to 13 mol % $Na_2O$,
from 0 to 12 mol % $K_2O+Rb_2O+Cs_2O$,
from 35 to 60 mol % $SiO_2$,
from 0.1 to 27 mol % of one or more transition metal oxides selected from the group consisting of $Fe_2O_3$, $MnO_2$, $Cr_2O_3$, and $Co_3O_4$,
from 1 to 27 mol % $B_2O_3$,
from 0.1 to 12 mol % $Al_2O_3$,
from 0.1 to 11 mol % $TiO_2$, and
from 0 to 40 mol % F,
wherein the composition is Bi-free and Zn-free.

2. The glass frit of claim 1 comprising:
from 4 to 13 mol % $Li_2O$,
from 5 to 13 mol % $Na_2O$,
from 0 to 12 mol % $K_2O+Rb_2O+Cs_2O$,
from 35 to 60 mol % $SiO_2$,
from 0.1 to 26 mol % of one or more transition metal oxides selected from the group consisting of $Fe_2O_3$, $MnO_2$, $Cr_2O_3$, and $Co_3O_4$,
from 1 to 25 mol % $B_2O_3$,
from 0.1 to 12 mol % $Al_2O_3$,
from 0.1 to 11 mol % $TiO_2$, and
from 0 to 35 mol % F.

3. The glass frit of claim 1 comprising:
from 6 to 13 mol % $Li_2O$,
from 6 to 12 mol % $Na_2O$,
from 0 to 9 mol % $K_2O+Rb_2O+Cs_2O$,
from 35 to 55 mol % $SiO_2$,
from 2 to 24.5 mol % of one or more transition metal oxides selected from the group consisting of $Fe_2O_3$, $MnO_2$, $Cr_2O_3$, and $Co_3O_4$,
from 3 to 25 mol % $B_2O_3$,
from 0.1 to 8 mol % $Al_2O_3$,
from 0.1 to 8 mol % $TiO_2$, and
from 0 to 30 mol % F.

4. The glass frit of claim 1 comprising:
from 6 to 12 mol % $Li_2O$,
from 7 to 12 mol % $Na_2O$,
from 0 to 9 mol % $K_2O+Rb_2O+Cs_2O$,
from 41 to 53 mol % $SiO_2$,
from 11 to 24.5 mol % of one or more transition metal oxides selected from the group consisting of $Fe_2O_3$, $MnO_2$, $Cr_2O_3$, and $Co_3O_4$,
from 9 to 23 mol % $B_2O_3$,
from 0.1 to 5 mol % $Al_2O_3$,
from 0.1 to 5 mol % $TiO_2$, and
from 0 to 30 mol % F.

5. The glass frit of claim 1 comprising:
from 8.3 to 12 mol % $Li_2O$,
from 6 to 9 mol % $Na_2O$,
from 0 to 7 mol % $K_2O+Rb_2O+Cs_2O$,
from 44 to 55 mol % $SiO_2$,
from 2 to 7 mol % of one or more transition metal oxides selected from the group consisting of $Fe_2O_3$, $MnO_2$, $Cr_2O_3$, and $Co_3O_4$,
from 3 to 10 mol % $B_2O_3$,
from 0.1 to 5 mol % $Al_2O_3$,
from 2 to 7.5 mol % $TiO_2$, and
from 0 to 30 mol % F.

6. The glass frit of claim 1 comprising:
from 5 to 10 mol % $Li_2O$,
from 6 to 11 mol % $Na_2O$,
from 0 to 10 mol % $K_2O+Rb_2O+Cs_2O$,
from 47 to 60 mol % $SiO_2$,
from 0.1 to 9 mol % of one or more transition metal oxides selected from the group consisting of $Fe_2O_3$, $MnO_2$, $Cr_2O_3$, and $Co_3O_4$,
from 5 to 17 mol % $B_2O_3$,
from 0.1 to 5 mol % $Al_2O_3$,
from 0.1 to 7 mol % $TiO_2$, and
from 0 to 35 mol % F.

7. The glass frit of claim 1 comprising:
from 6 to 10 mol % $Li_2O$,
from 6.5 to 11.5 mol % $Na_2O$,
from 0 to 7.5 mol % $K_2O+Rb_2O+Cs_2O$,
from 49 to 58 mol % $SiO_2$,
from 0.1 to 4 mol % of one or more transition metal oxides selected from the group consisting of $Fe_2O_3$, $MnO_2$, $Cr_2O_3$, and $Co_3O_4$,
from 8 to 15 mol % $B_2O_3$,
from 0.1 to 3.5 mol % $Al_2O_3$,
from 1 to 6 mol % $TiO_2$, and
from 0 to 30 mol % F.

\* \* \* \* \*